United States Patent
Baumann et al.

(10) Patent No.: US 8,886,981 B1
(45) Date of Patent: Nov. 11, 2014

(54) SYSTEMS AND METHODS FOR IDLE DRIVEN SCHEDULING

(75) Inventors: William R. Baumann, Seattle, WA (US); Saul Lewites, Renton, WA (US)

(73) Assignee: F5 Networks, Inc., Seattle, WA (US)

(*) Notice: Subject to any disclaimer, the term of this patent is extended or adjusted under 35 U.S.C. 154(b) by 418 days.

(21) Appl. No.: 13/234,031

(22) Filed: Sep. 15, 2011

Related U.S. Application Data (60) Provisional application No. 61/383,302, filed on Sep. 15, 2010.

(51) Int. Cl.
*G06F 1/00* (2006.01)
*G06F 1/32* (2006.01)

(52) U.S. Cl.
CPC .................. *G06F 1/3203* (2013.01)
USPC ........................................ 713/323

(58) Field of Classification Search
CPC ..... G06F 1/3203; G06F 1/3209; G06F 1/329; Y02B 60/1278
USPC ................................. 713/300–340
See application file for complete search history.

(56) References Cited

U.S. PATENT DOCUMENTS

| | | | |
|---|---|---|---|
| 3,950,735 A | 4/1976 | Patel | |
| 4,644,532 A | 2/1987 | George et al. | |
| 4,897,781 A | 1/1990 | Chang et al. | |
| 4,965,772 A | 10/1990 | Daniel et al. | |
| 5,023,826 A | 6/1991 | Patel | |
| 5,053,953 A | 10/1991 | Patel | |
| 5,167,024 A * | 11/1992 | Smith et al. | 713/322 |
| 5,299,312 A | 3/1994 | Rocco, Jr. | |
| 5,327,529 A | 7/1994 | Fults et al. | |
| 5,367,635 A | 11/1994 | Bauer et al. | |
| 5,371,852 A | 12/1994 | Attanasio et al. | |
| 5,406,502 A | 4/1995 | Haramaty et al. | |
| 5,475,857 A | 12/1995 | Dally | |
| 5,517,617 A | 5/1996 | Sathaye et al. | |

(Continued)

FOREIGN PATENT DOCUMENTS

| | | |
|---|---|---|
| EP | 0744850 A2 | 11/1996 |
| WO | WO 91/14326 | 9/1991 |

(Continued)

OTHER PUBLICATIONS

"A Process for Selective Routing of Servlet Content to Transcoding Modules," Research Disclosure 422124, Jun. 1999, pp. 889-890, IBM Corporation.

(Continued)

*Primary Examiner* — Paul R Myers
(74) *Attorney, Agent, or Firm* — LeClairRyan, a Professional Corporation (57) ABSTRACT

A system and method of idle driven scheduling in a network device is disclosed. An interrupt signal is received from a timer, wherein a network processing component of a network device awakes from sleep mode of a first sleep duration for a first cycle upon receiving the interrupt signal. Load information of a computer processing unit in the network device for the first cycle is determined. A second sleep duration is selected for the network processing component in a second cycle based on the load information, wherein the second sleep duration is different from the first sleep duration. The timer is then instructed to send the interrupt signal to the network processing component at an expiration of the second sleep duration.

15 Claims, 4 Drawing Sheets

(56) References Cited

U.S. PATENT DOCUMENTS

| | | |
|---|---|---|
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,832,283 A * | 11/1998 | Chou et al. ............... 713/300 |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,480,476 B1 * | 11/2002 | Willars ............... 370/311 |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,694,517 B1 * | 2/2004 | James et al. ............... 725/127 |
| 6,708,187 B1 | 3/2004 | Shanumgam et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,804,542 B1 * | 10/2004 | Haartsen ............... 455/574 |
| 6,816,901 B1 | 11/2004 | Sitaraman et al. |
| 6,816,977 B2 * | 11/2004 | Brakmo et al. ............... 713/323 |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,133,944 B2 * | 11/2006 | Song et al. ............... 710/100 |
| 7,139,792 B1 | 11/2006 | Mishra et al. |
| 7,228,422 B2 | 6/2007 | Morioka et al. |
| 7,287,082 B1 | 10/2007 | O'Toole, Jr. |
| 7,295,827 B2 * | 11/2007 | Liu et al. ............... 455/343.2 |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,398,552 B2 | 7/2008 | Pardee et al. |
| 7,454,480 B2 | 11/2008 | Labio et al. |
| 7,490,162 B1 | 2/2009 | Masters |
| 7,500,269 B2 | 3/2009 | Huotari et al. |
| 7,505,795 B1 * | 3/2009 | Lim et al. ............... 455/574 |
| 7,526,541 B2 | 4/2009 | Roese et al. |
| 7,558,197 B1 | 7/2009 | Sindhu et al. |
| 7,580,971 B1 | 8/2009 | Gollapudi et al. |
| 7,624,424 B2 | 11/2009 | Morita et al. |
| 7,668,166 B1 | 2/2010 | Rekhter et al. |
| 7,724,657 B2 | 5/2010 | Rao et al. |
| 7,725,093 B2 * | 5/2010 | Sengupta et al. ............. 455/343.1 |
| 7,778,187 B2 | 8/2010 | Chaturvedi et al. |
| 7,801,978 B1 | 9/2010 | Susai et al. |
| 7,831,662 B2 | 11/2010 | Clark et al. |
| 7,908,314 B2 | 3/2011 | Yamaguchi et al. |
| 7,925,908 B2 * | 4/2011 | Kim ............... 713/320 |
| 7,945,908 B1 | 5/2011 | Waldspurger et al. |
| 8,130,650 B2 | 3/2012 | Allen, Jr. et al. |
| 8,199,757 B2 | 6/2012 | Pani et al. |
| 8,351,333 B2 | 1/2013 | Rao et al. |
| 8,380,854 B2 | 2/2013 | Szabo |
| 8,447,871 B1 | 5/2013 | Szabo |
| 8,464,265 B2 | 6/2013 | Worley |
| 8,606,921 B2 | 12/2013 | Vasquez et al. |
| 8,615,022 B2 | 12/2013 | Harrison et al. |
| 8,665,868 B2 | 3/2014 | Kay |
| 2001/0009554 A1 | 7/2001 | Katseff et al. |
| 2001/0023442 A1 | 9/2001 | Masters |
| 2002/0059428 A1 | 5/2002 | Susai et al. |
| 2002/0138615 A1 | 9/2002 | Schmeling |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0065951 A1 | 4/2003 | Igeta et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0086415 A1 | 5/2003 | Bernhard et al. |
| 2003/0105983 A1 * | 6/2003 | Brakmo et al. ............... 713/320 |
| 2003/0108052 A1 | 6/2003 | Inoue et al. |

(56) References Cited

U.S. PATENT DOCUMENTS

| | | |
|---|---|---|
| 2003/0128708 A1 | 7/2003 | Inoue et al. |
| 2003/0145062 A1 | 7/2003 | Sharma et al. |
| 2003/0145233 A1 | 7/2003 | Poletto et al. |
| 2003/0225485 A1 | 12/2003 | Fritz et al. |
| 2004/0003287 A1 | 1/2004 | Zissimopoulos et al. |
| 2004/0072569 A1 | 4/2004 | Omae et al. |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0151186 A1 | 8/2004 | Akama |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |
| 2005/0021736 A1 | 1/2005 | Carusi et al. |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0078604 A1 | 4/2005 | Yim |
| 2005/0122977 A1 | 6/2005 | Lieberman |
| 2005/0154837 A1 | 7/2005 | Keohane et al. |
| 2005/0187866 A1 | 8/2005 | Lee |
| 2005/0188220 A1 | 8/2005 | Nilsson et al. |
| 2005/0198310 A1 | 9/2005 | Kim et al. |
| 2005/0262238 A1 | 11/2005 | Reeves et al. |
| 2006/0031520 A1 | 2/2006 | Bedekar et al. |
| 2006/0059267 A1 | 3/2006 | Cugi et al. |
| 2006/0112176 A1 | 5/2006 | Liu et al. |
| 2006/0112272 A1 | 5/2006 | Morioka et al. |
| 2006/0156416 A1 | 7/2006 | Huotari et al. |
| 2006/0161577 A1 | 7/2006 | Kulkarni et al. |
| 2006/0171365 A1 | 8/2006 | Borella |
| 2006/0209853 A1 | 9/2006 | Hidaka et al. |
| 2006/0230148 A1 | 10/2006 | Forecast et al. |
| 2006/0233106 A1 | 10/2006 | Achlioptas et al. |
| 2006/0242300 A1 | 10/2006 | Yumoto et al. |
| 2007/0006293 A1 | 1/2007 | Balakrishnan et al. |
| 2007/0016662 A1 | 1/2007 | Desai et al. |
| 2007/0058670 A1 | 3/2007 | Konduru et al. |
| 2007/0064661 A1 | 3/2007 | Sood et al. |
| 2007/0083646 A1 | 4/2007 | Miller et al. |
| 2007/0088822 A1 | 4/2007 | Coile et al. |
| 2007/0106796 A1 | 5/2007 | Kudo et al. |
| 2007/0107048 A1 | 5/2007 | Halls et al. |
| 2007/0118879 A1 | 5/2007 | Yeun |
| 2007/0174491 A1 | 7/2007 | Still et al. |
| 2007/0220598 A1 | 9/2007 | Salowey et al. |
| 2007/0233809 A1 | 10/2007 | Brownell et al. |
| 2007/0297551 A1 | 12/2007 | Choi |
| 2008/0025297 A1 | 1/2008 | Kashyap |
| 2008/0034136 A1 | 2/2008 | Ulenas |
| 2008/0072303 A1 | 3/2008 | Syed |
| 2008/0120370 A1 | 5/2008 | Chan et al. |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0159145 A1 | 7/2008 | Muthukrishnan et al. |
| 2008/0201599 A1 | 8/2008 | Ferraiolo et al. |
| 2008/0225710 A1 | 9/2008 | Raja et al. |
| 2008/0229415 A1 | 9/2008 | Kapoor et al. |
| 2008/0253395 A1 | 10/2008 | Pandya |
| 2008/0256224 A1 | 10/2008 | Kaji et al. |
| 2008/0301760 A1 | 12/2008 | Lim |
| 2009/0028337 A1 | 1/2009 | Balabine et al. |
| 2009/0049230 A1 | 2/2009 | Pandya |
| 2009/0070617 A1 | 3/2009 | Arimilli et al. |
| 2009/0077619 A1 | 3/2009 | Boyce |
| 2009/0094610 A1 | 4/2009 | Sukirya |
| 2009/0119504 A1 | 5/2009 | van Os et al. |
| 2009/0125625 A1 | 5/2009 | Shim et al. |
| 2009/0138749 A1 | 5/2009 | Moll et al. |
| 2009/0141891 A1 | 6/2009 | Boyen et al. |
| 2009/0196282 A1 | 8/2009 | Fellman et al. |
| 2009/0228956 A1 | 9/2009 | He et al. |
| 2009/0287935 A1 | 11/2009 | Aull et al. |
| 2009/0296624 A1 | 12/2009 | Ryu et al. |
| 2009/0300407 A1 | 12/2009 | Kamath et al. |
| 2010/0011434 A1 | 1/2010 | Kay |
| 2010/0023582 A1 | 1/2010 | Pedersen et al. |
| 2010/0071048 A1 | 3/2010 | Novak et al. |
| 2010/0115236 A1 | 5/2010 | Bataineh et al. |
| 2010/0122091 A1 | 5/2010 | Huang et al. |
| 2010/0150154 A1 | 6/2010 | Viger et al. |
| 2010/0242092 A1 | 9/2010 | Harris et al. |
| 2010/0251330 A1 | 9/2010 | Kroeselberg et al. |
| 2010/0279733 A1 | 11/2010 | Karsten et al. |
| 2010/0322250 A1 | 12/2010 | Shetty et al. |
| 2010/0325277 A1 | 12/2010 | Muthiah et al. |
| 2011/0040889 A1 | 2/2011 | Garrett et al. |
| 2011/0047620 A1 | 2/2011 | Mahaffey et al. |
| 2011/0066718 A1 | 3/2011 | Susai et al. |
| 2011/0154443 A1 | 6/2011 | Thakur et al. |
| 2011/0173295 A1 | 7/2011 | Bakke et al. |
| 2011/0184733 A1 | 7/2011 | Yu et al. |
| 2011/0273984 A1 | 11/2011 | Hsu et al. |
| 2011/0282997 A1 | 11/2011 | Prince et al. |
| 2011/0321122 A1 | 12/2011 | Mwangi et al. |
| 2012/0039341 A1 | 2/2012 | Latif et al. |
| 2012/0041965 A1 | 2/2012 | Vasquez et al. |
| 2012/0063314 A1 | 3/2012 | Pignataro et al. |
| 2012/0066489 A1 | 3/2012 | Ozaki et al. |
| 2013/0336122 A1 | 12/2013 | Baruah et al. |
| 2014/0095661 A1 | 4/2014 | Knowles et al. |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

"Big-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

Crescendo Networks, "Application Layer Processing (ALP)," 2003-2009, pp. 168-186, Chapter 9, CN-5000E/5500E, Foxit Software Company.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176, The Internet Society.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

"Servlet/Applet/HTML authentication process with single sign-on," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

Williams et al., "The Ultimate Windows Server 2003 System Administrator's Guide: Forwarding Authentication," 2003, 2 pages, Figure 10.7, Addison-Wesley Professional, Boston, Massachusetts.

(56) References Cited

OTHER PUBLICATIONS

"Windows Server 2003 Kerberos Extensions," Microsoft TechNet, 2003, 8 pages, (Updated Jul. 31, 2004), http://technet.microsoft.com/en-us/library/cc738207, Microsoft Corporation.

Macvittie, Lori, "Message-Based Load Balancing," Technical Brief, Jan. 2010, pp. 1-9, F5 Networks, Inc.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

OWASP, "Testing for Cross site scripting", OWASP Testing Guide v2, Table of Contents, Feb. 24, 2011, pp. 1-5, (www.owasp.org/index.php/Testing_for_Cross_site_scripting).

International Search Report for International Patent Application No. PCT/US2013/026615 (Jul. 4, 2013).

F5 Networks Inc., "Configuration Guide for Local Traffic Management," F5 Networks Inc., Jan. 2006, version 9.2.2, 406 pgs.

U.S. Appl. No. 13/400,398 to Paul Jiang, filed Feb. 20, 2012.

U.S. Appl. No. 13/164,672 to Nat Thirasuttakorn et al., filed Jun. 20, 2014.

U.S. Appl. No. 13/234,042 to Baumann et al., filed Sep. 15, 2011.

U.S. Appl. No. 13/234,047 to Wojcik, filed Sep. 15, 2011.

U.S. Appl. No. 13/235,276 to Hawthorne et al., filed Sep. 16, 2011.

U.S. Appl. No. 12/822,146 to Jeff Costlow, filed Jun. 23, 2010.

U.S. Appl. No. 13/165,783 to Jain et al., filed Jun. 21, 2011.

\* cited by examiner

SYSTEMS AND METHODS FOR IDLE DRIVEN SCHEDULING

STATEMENT OF RELATED APPLICATION

The present application claims the benefit of priority based on U.S. Provisional Patent Application Ser. No. 61/383,302, filed on Sep. 15, 2010, in the names of William Bauman and Saul Lewites, entitled "Systems and Methods for Idle Driven Scheduling", all commonly owned herewith.

TECHNOLOGICAL FIELD

This technology generally relates to processing of network applications, and more particularly, to systems and methods for idle-driven scheduling.

BACKGROUND

Currently, the way modern operating systems handle the problem of the conflicting demands of latency and overhead, is with two settings. With one setting the hardware is set to coalesce the data at a set frequency (controlled by network interface controller hardware) to minimize latency. In the other setting the hardware's interrupts are disabled, and software polls on a frequency driven by the operating system's tick. The continuum of scenarios between the extremes is left unaddressed. The timer mechanism works optimally when there is heavy and constant traffic or there is little concern about the response time to new work. The problem lies in scenarios where there is a dribble of traffic and/or the respond time is critical. Since the introduction of network interface controller hardware, there has been an issue due to the conflicting demands of reducing latency and reducing overhead. Various approaches have been used, each with their own drawbacks.

What is needed is an approach that uses software to control the timer hardware as driven by system idle CPU time to reduce latency and overhead as dictated by system needs.

SUMMARY

In an aspect, a method of idle driven scheduling in a network device is disclosed. The method includes receiving an interrupt signal from a timer, wherein a network processing component of a network device awakes from sleep mode of a first sleep duration for a first cycle upon receiving the interrupt signal. The method includes determining load information of a computer processing unit in the network device for the first cycle. The method includes selecting a second sleep duration for the network processing component in a second cycle based on the load information, wherein the second sleep duration is different from the first sleep duration. The method includes instructing the timer to send the interrupt signal to the network processing component at an expiration of the second sleep duration.

In an aspect, a non-transitory machine readable medium which includes readable executable code, which when executed by a machine, causes the machine to receive an interrupt signal from a timer. A network processing component of a network device awakes from sleep mode of a first sleep duration for a first cycle upon receiving the interrupt signal. Load information determines of a computer processing unit in the network device for the first cycle. A second sleep duration for the network processing component is selected in a second cycle based on the load information, wherein the second sleep duration is different from the first sleep duration. The timer is instructed to send the interrupt signal to the network processing component at an expiration of the second sleep duration.

In an aspect, a network device comprises one or more processors; a memory coupled to the one or more processors by a bus; and a network interface controller coupled to the one or more processors and the memory and configured to be capable of receiving and forwarding data packets from a network that relate to a plurality of applications. The network device includes at least one of the one or more processors configured to execute programmed instructions stored in the memory and the network interface controller with logic configured to receive an interrupt signal from a timer. A network processing component of a network device awakes from sleep mode of a first sleep duration for a first cycle upon receiving the interrupt signal. The load information of a computer processing unit is determine in the network device for the first cycle. A second sleep duration for the network processing component is selected in a second cycle based on the load information, wherein the second sleep duration is different from the first sleep duration. The timer is instructed to send the interrupt signal to the network processing component at an expiration of the second sleep duration.

While these examples are susceptible of embodiments in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

Figure 1:
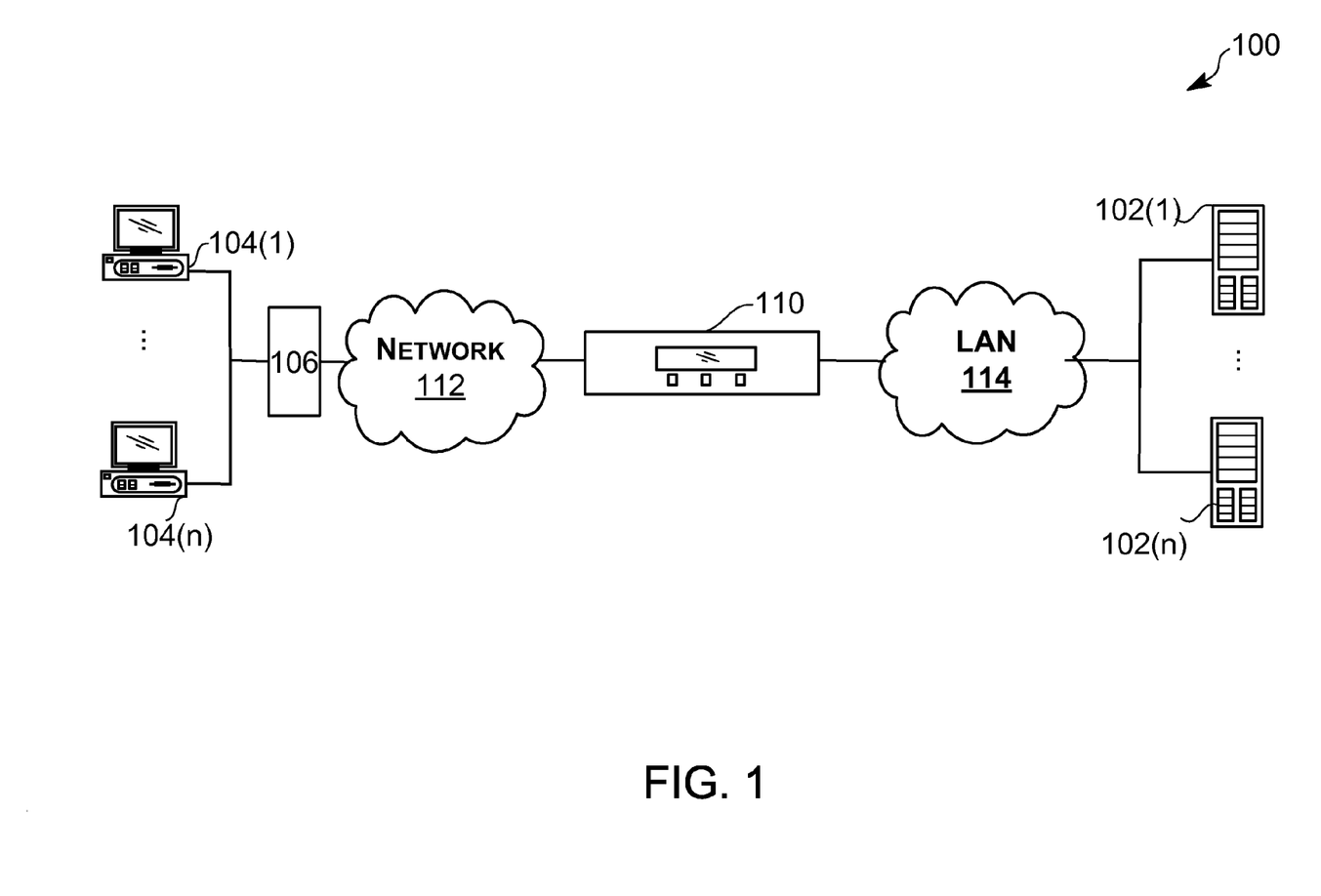
FIG. 1 illustrates an exemplary network system environment for processing of network applications.

Referring to FIG. 1, an exemplary network system 100 including network device 110 that is configured to provide idle driven scheduling of network processes running on cores is illustrated. By way of example only, a network 112 can provide responses and requests according to the Hyper-Text Transfer Protocol (HTTP) based application, request for comments (RFC) document guidelines or the Common Internet File System (CIFS) or network file system (NFS) protocol in this example, although the principles discussed herein are not limited to these examples and can include other application protocols and other types of requests (e.g., File Transfer Protocol (FTP) based requests). The exemplary network system 100 can include a series of one or more client devices such as client computers 104(1) to 104(n). Client computers 104(1)-104(n) are coupled to network device 110 via a local domain name server (LDNS) 106. In some examples, LDNS 106 is optional and client computers 104(1)-104(n) are coupled to network device 110 directly or via a network 112. Network device 110 is interposed in between servers 102(1) to 102(n) and the client devices 104(1) to 104(n) for providing one or more communication channels through network 112 and a Local Area Network (LAN) 114, although other communication channels may be directly established between various devices in network system 100 without network 112 and/or LAN 114. For clarity and brevity, in FIG. 1 two server devices 102(1) and 102(n) are shown, but it should be understood that any number of server devices can use the exemplary network system 100. Likewise, two client devices 104 (1)-104(n), one LDNS 106, and one network device 110 are shown in FIG. 1, but any number of client devices, LDNSs, and traffic management devices can also use the exemplary network system 100 as well. Although network 112 and LAN 114 are shown, other numbers and types of networks could be used. The ellipses and the designation "n" denote an unlimited number of server devices and client devices, respectively.

Servers 102(1)-102(n) comprise one or more server computing machines or devices capable of operating one or more Web-based applications that may be accessed by network devices in the network 112, such as client computers 104(1)-104(n) (also referred to as client devices 104(1)-104(n)), via network device 110, and may provide other data representing requested resources, such as domain name services and zones, particular Web page(s) corresponding to URL request(s), image(s) of physical objects, and any other objects, responsive to the requests, although the servers 102(1)-102(n) may perform other tasks and provide other types of resources. It should be noted that while only two servers 102(1) and 102(n) are shown in the network system 100 depicted in FIG. 1, other numbers and types of servers may be coupled to the network device 110. It is also contemplated that one or more of the servers 102(1)-102(n) may be a cluster of servers managed by a network traffic management device such as network device 110.

The client computers 104(1)-104(n) in this example (also interchangeably referred to as client devices 104(1)-104(n), client computing devices 104(1)-104(n), clients 104(1)-104(n), and client computing systems 104(1)-104(n)) can run interface applications such as Web browsers that can provide an interface to make requests for and send data to different Web server-based applications via LDNS 106 connected to the network 112 and/or via network device 110. A series of network applications can run on the servers 102(1)-102(n) that allow the transmission of data that is requested by the client computers 104(1)-104(n). Servers 102(1)-102(n) can provide data or receive data in response to requests directed toward the respective applications on the servers 102(1)-102(n) from the client computers 104(1)-104(n).

For example, as per the Transmission Control Protocol (TCP), packets can be sent to the servers 102(1)-102(n) from the requesting client computers 104(1)-104(n) to send data, although other protocols (e.g., FTP) may be used. It is to be understood that the servers 102(1)-102(n) can be hardware or software executing on and supported by hardware, or can represent a system with multiple servers, which can include internal or external networks. Further, additional servers can be coupled to the network 112 and/or LAN 114 and many different types of applications can be available on servers coupled to the network 112 and/or LAN 114.

Generally, the client devices such as the client computers 104(1)-104(n) can include virtually any computing device capable of connecting to another computing device to send and receive information, including Web-based information. The set of such devices can include devices that typically connect using a wired (and/or wireless) communications medium, such as personal computers (e.g., desktops, laptops), mobile and/or smart phones and the like. In this example, the client devices can run browsers and other types of applications (e.g., web-based applications) that can provide an interface to make one or more requests to different server-based applications via network 112, although requests for other types of network applications and resources, for example URLs, may be made by client computers 104(1)-104(n).

Client computers 104(1)-104(n) can submit requests to LDNS 106. LDNS 106 can respond to the requests when resources are locally stored on LDNS 106, for example, in a local cache memory. For example, a client computer may request for a URL www.example.com. If LDNS 106 has a valid copy of www.example.com, it can directly provide this URL to the requesting client computer. In other scenarios, LDNS 106 forwards the requests to network device 110 via network 112. LDNS 106 can be configured to expedite requests for network resources (e.g., URLs) based upon a history of requests from one or more client computers 104(1)-104(n). In one example, LDNS 106 can provide an initial response to a requesting one of client computers 104(1)-104(n) while additional resources are being fetched from servers 102(1)-102(n) resulting in a faster initial response for a request from client computers 104(1)-104(n). By way of example only, LDNS 106 can be a proxy server, or a server similar to servers 102(1)-102(n) but located between client computers 104(1)-104(n) and network device 110.

A series of Web-based and/or other types of protected and unprotected network applications can run on servers 102(1)-102(n) that allow the transmission of data that is requested by the client computers 104(1)-104(n). The client computers 104(1)-104(n) can be further configured to engage in a secure communication directly with the network device 110 and/or the servers 102(1)-102(n), via LDNS 106, or otherwise, using mechanisms such as Secure Sockets Layer (SSL), Internet Protocol Security (IPSec), Transport Layer Security (TLS), and the like.

In this example, network 112 comprises a publicly accessible network, such as the Internet, which includes client computers 104(1)-104(n), although network 112 may comprise other types of private and public networks that include other devices. Communications, such as requests from client computers 104(1)-104(n) and responses from servers 102(1)-102(n), take place over network 112 according to standard network protocols, such as the HTTP and TCP/IP protocols in this example, but the principles discussed herein are not limited to this example and can include other protocols (e.g., FTP). Further, network 112 can include local area networks (LANs), wide area networks (WANs), direct connections, other types and numbers of network types, and any combination thereof. On an interconnected set of LANs or other networks, including those based on different architectures and protocols, routers, switches, hubs, gateways, bridges, crossbars, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links, optical fibers, and other communications links known to those of ordinary skill in the relevant arts. Generally, network 112 includes any communication medium and method by which data may travel between client devices 104(1)-104(n), servers 102(1)-102(n), and network device 110, and these devices are provided by way of example only.

In this example, each of the servers 102(1)-102(n), network device 110, LDNS 106, and client computers 104(1)-104(n) can include a central processing unit (CPU), controller or processor, a memory, and an interface system which are coupled together by a bus or other link, although other numbers and types of each of the components and other configurations and locations for the components can be used. Since these devices are well known to those of ordinary skill in the relevant art(s), they will not be described in further detail herein.

In addition, two or more computing systems or devices can be substituted for any one of the systems in the network system 100. Accordingly, principles and advantages of cloud computing and/or distributed processing, such as redundancy, replication, virtualization, and the like, can also be implemented, as appropriate, to increase the robustness and performance of the devices and systems of the network system 100. The network system 100 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, combination(s) thereof, and the like.

By way of example only and not by way of limitation, LAN 114 comprises a private local area network that includes the network device 110 coupled to the one or more servers 102(1)-102(n), although the LAN 114 may comprise other types of private and public networks with other devices. Networks, including local area networks, besides being understood by those of ordinary skill in the relevant art(s), have already been described above in connection with network 112, and thus will not be described further here.

As shown in the example environment of network system 100 depicted in FIG. 1, the network device 110 can be interposed between the network 112 and the servers 102(1)-102(n) coupled via LAN 114 as shown in FIG. 1. Again, the network system 100 could be arranged in other manners with other numbers and types of devices. Also, the network device 110 is coupled to network 112 by one or more network communication links, and intermediate network devices, such as routers, switches, gateways, hubs, crossbars, and other devices. It should be understood that the devices and the particular configuration shown in FIG. 1 are provided for exemplary purposes only and thus are not limiting. Although a single network device 110, additional traffic management devices may be coupled in series and/or parallel to the network device 110, thereby forming a cluster, depending upon specific applications, and the single network device 110 shown in FIG. 1 is by way of example only, and not by way of limitation.

Generally, the network device 110 manages network communications, which may include one or more client requests and server responses, to/from the network 112 between the client computers 104(1)-104(n) and one or more of the servers 102(1)-102(n) in LAN 114 in these examples. These requests may be destined for one or more servers 102(1)-102(n), and, as alluded to earlier, may take the form of one or more TCP/IP data packets originating from the network 112, passing through one or more intermediate network devices and/or intermediate networks, until ultimately reaching the network device 110, for example.

In one example, network device 110 is configured as a global server load balancing device that distributes end-user application requests based on business policies, data center conditions, network conditions, user location, and application performance, such that each request from client computers 104(1)-104(n) is automatically directed to the closest or best-performing data center hosting one or more servers 102(1)-102(n).

In addition, as discussed in more detail with reference to FIGS. 2-5, network device 110 is configured to provide processing of network applications. In any case, the network device 110 may manage the network communications by performing several network traffic management related functions involving network communications, secured or unsecured, such as load balancing, access control, VPN hosting, network traffic acceleration, encryption, decryption, cookie, and key management in accordance with the systems and processes, described further below in connection with FIGS. 2-5, for example.

Figure 2:
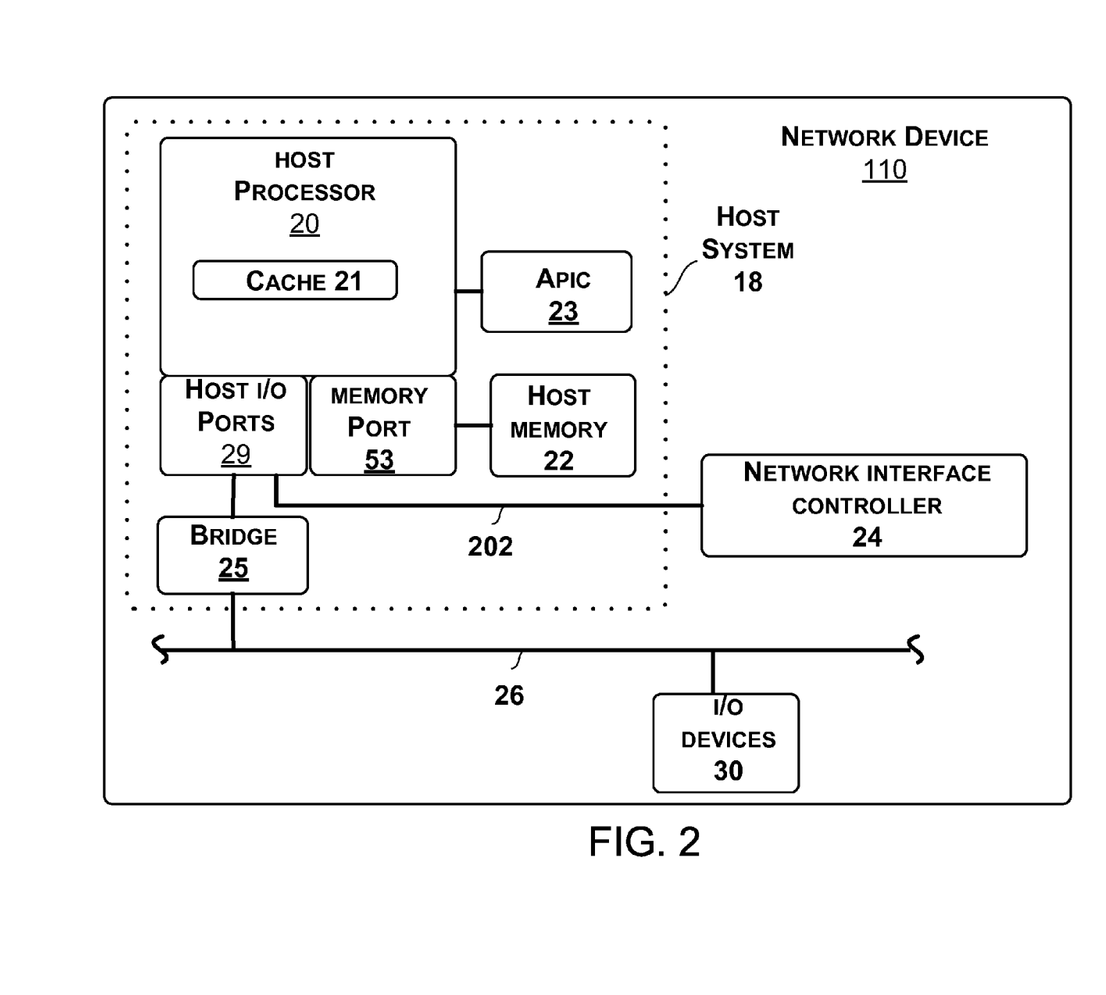
FIG. 2 is a partly schematic and partly functional block diagram of a traffic management device in the exemplary network environment of FIG. 1.

Referring to FIG. 2, an exemplary network device 110 is illustrated in accordance with an aspect of the present disclosure. Included within the network device 110 is a system bus 26 (also referred to as bus 26) that communicates with a host system 18 via a bridge 25 and with an input-output (I/O) device 30. In this example, a single I/O device 30 is shown to represent any number of I/O devices connected to bus 26. In one example, bridge 25 is in further communication with a host processor 20 via host input output (I/O) ports 29. Host processor 20 can further communicate with a network interface controller 24 via a CPU bus 202, a host memory 22 (via a memory port 53), and a cache memory 21. As outlined above, included within the host processor 20 are host I/O ports 29, memory port 53, and a main processor (not shown separately).

In an aspect, network device 110 can include the host processor 20 characterized of the following component configurations: computer readable medium and logic circuits that respond to and process instructions fetched from the host memory 22; a microprocessor unit, such as: those manufactured by Intel Corporation of Santa Clara, Calif.; those manufactured by Motorola Corporation of Schaumburg, Ill.; those manufactured by Transmeta Corporation of Santa Clara, Calif.; the RS/6000 processor such as those manufactured by International Business Machines of Armonk, N.Y.; a processor such as those manufactured by Advanced Micro Devices of Sunnyvale, Calif.; or any other combination of logic circuits capable of executing the systems and methods described herein. Still other examples of the host processor 20 can include any combination of the following: a microprocessor, a microcontroller, a central processing unit with a single processing core, a central processing unit with two processing cores, or a central processing unit with more than one processing core.

Examples of the network device 110 include one or more application delivery controller devices of the BIG-IP® product family provided by F5 Networks, Inc. of Seattle, Wash., although other types of traffic management devices may be used. Alternatively, network device 110 may be one of servers 102(1)-102(n) having one or more network blades, or maybe inside one of servers 102(1)-102(n). In an exemplary structure and/or arrangement, network device 110 can include one or more host processors 20 that communicate with cache memory 21 via a secondary bus also known as a backside bus. In another aspect, the host processor 20 of the network device 110 communicates with cache memory 21 via the system bus 26. The local system bus 26 can, in some examples, also be used by the host processor 20 to communicate with more than one type of I/O devices 30.

It is contemplated that the local system bus 26 can be any of the following types of buses: a VESA VL bus; an ISA bus; an EISA bus; a Micro Channel Architecture (MCA) bus; a PCI bus; a PCI-X bus; a PCI-Express bus; or a NuBus. Other example configurations of the network device 110 include I/O device 30 that is a video display (not shown separately) that communicates with the host processor 20 via an Advanced Graphics Port (AGP). Still other aspects of the network device 110 have the host processor 20 connected to I/O device 30 via one or more of the following connections: HyperTransport, Rapid I/O, InfiniBand, and the like. Further examples of the network device 110 include a communication connection where the host processor 20 communicates with one I/O device 30 using a local interconnect bus and with a second I/O device (not shown separately) using a direct connection.

As described above, included within some examples of the network device 110 is each of host memory 22 and cache memory 21. It is contemplated that the cache memory 21 may be any of the following types of memory: SRAM; BSRAM; EDRAM and the like. Other examples include cache memory 21 and host memory 22 that can be any of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein.

The host memory 22 and/or the cache memory 21 can, in some examples, include one or more memory devices capable of storing data and allowing any storage location to be directly accessed by the host processor 20. Such storage of data can be in a local database internal to network device 110, or external to network device 110 coupled via one or more input output ports of network interface controller 24. Further examples of network device 110 include a host processor 20 that can access the host memory 22 via a system bus 26, memory port 5, or any other connection, bus or port.

One example of the network device 110 provides support for anyone of the following installation devices: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable compact disk (CD) for GNU/Linux distribution such as KNOPPIX®, a hard-drive or any other device suitable for installing applications or software.

In an aspect, applications may include a client agent, or any portion of a client agent. The network device 110 may further include a storage device (not shown separately) that can be either one or more hard disk drives, or one or more redundant arrays of independent disks. The storage device is configured to store an operating system, software, programs applications, or at least a portion of the client agent. A further example of the network device 110 includes an installation device that is used as the storage device.

Furthermore, the network device 110 can include a network interface controller 24 which communicates, via an input-output port inside network interface controller 24, with a Local Area Network (LAN), Wide Area Network (WAN) and/or the Internet. It is contemplated that the network device 110 is able to communicate through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, optical connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections).

In an aspect, the network interface controller 24 is configured to communicate with additional computing devices via any type and/or form of gateway or tunneling protocol such as Secure Socket Layer (SSL) or Transport Layer Security (TLS), or the Citrix Gateway Protocol manufactured by Citrix Systems, Inc. of Fort Lauderdale, Fla. Versions of the network interface controller 24 can include a built-in network adapter; a network interface card; a PCMCIA network card; a card bus network adapter; a wireless network adapter; a USB network adapter; a modem; or any other device suitable for interfacing the network device 110 to a network capable of communicating and performing the methods and systems described herein.

In an aspect, the network device 110 can include any one of the following I/O devices 30: a keyboard; a pointing device; a mouse; a gesture based remote control device; a biometric device; an audio device; track pads; an optical pen; trackballs; microphones; drawing tablets; video displays; speakers; inkjet printers; laser printers; dye sublimation printers; or any other input/output device able to perform the methods and systems described herein. Host I/O ports 29 may in some examples connect to multiple I/O devices 30 to control the one or more I/O devices 30. In an aspect, one or more of the I/O devices 30 may be configured to provide storage or an installation medium, while one or more other I/O devices 30 may provide a universal serial bus (USB) interface for receiving USB storage devices such as the USB Flash Drive line of devices. Still other examples of an I/O device 30 may be bridge 25 between the system bus 26 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; a Serial Attached small computer system interface bus and the like.

Accordingly, components of network device 110 include one or more processors (e.g., host processor 20) executing one or more traffic management applications and/or server applications. Components of the network device include one or more memory (e.g., cache memory 21, and/or host memory 22) coupled to the one or more processors by a bus, network interface controller 24 coupled to the one or more processors and the host memory 22.

In this example, at least one of the one or more processors is configured to execute programmed instructions stored in the memory (e.g., cache memory 21, and/or host memory 22) and the network interface controller 24 including logic capable of being further configured to implement the method of the present disclosure.

Figure 3:
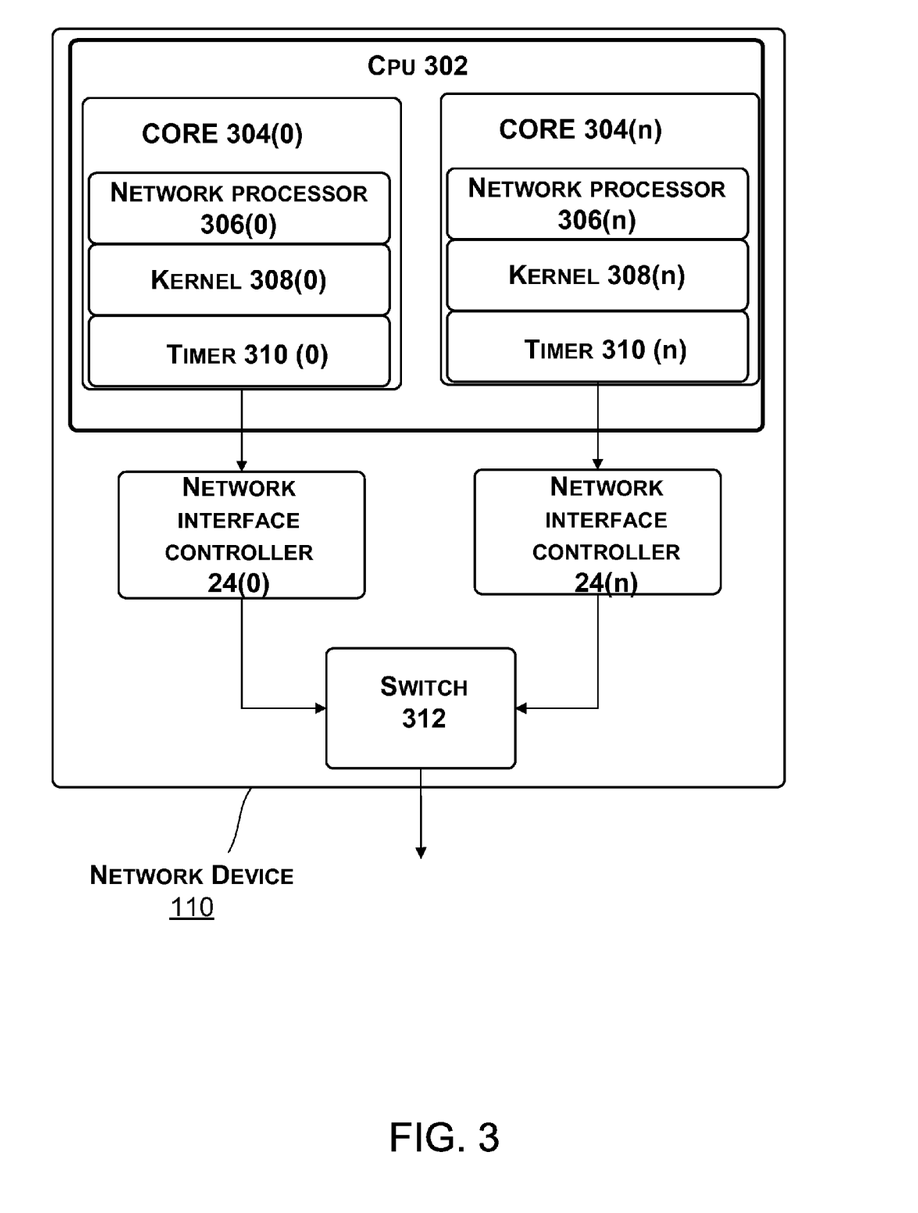
FIG. 3 is an exemplary block diagram of a processor executing multiple cores for network applications.

FIG. 3 illustrates a partly functional and partly internal schematic diagram of exemplary components of network device 110 in accordance with an aspect of the present disclosure. As shown in FIG. 3, the network device 100 includes one or more Central Processing Units (CPU) 302 coupled to one or more Network Interface Controllers 24(0)-24(n) via buses 202(0)-202(n). CPU 302 is considered herein as a part of the host processor 20 (FIG. 2) whereby the Network Interface Controllers (0)-24(n) are considered herein as a part of network interface controller 24 (FIG. 2). Buses 202(0)-202(*n*) are a part of bus 202, although other types of connections may be used.

In an aspect, the CPU 302 includes one or more cores 304(0)-304(*n*) running network processes 306(0)-306(*n*), whereby the cores send signals to one or more of the network interface controllers 24(0)-24(*n*). For example, core 304(0) may write a data packet a control register in the network interface controller 24(0). It is to be noted cores 304(0)-304(*n*) are shown in sequential order by way of example only and not as a limitation, and respective indices of cores 304(0)-304(*n*) are not meant to be indicative of a specific order in which the cores 304(0)-304(*n*) may be executing.

In an aspect, for a given instance in time, one or more of all the cores (e.g., 304(1), **304(*k*), and 304(*n*)) can be active while other cores may not be active. Cores 304(0)-304**(*n*) execute respective network processes 306(0)-306(*n*) in one or more kernel modules 308(0)-308(*n*). In an aspect, a core 304(0) may execute one or more kernel processes in software by using a kernel module 308(0). Alternatively, network processes 306(0)-306(*n*) may execute as firmware of the network device, a user space, and/or a hardware logic of the network device. In an aspect, two or more of the cores 304(0)-304(*n*) in the network device 110 can each be executing respective threads of one or more network processes using the network processes 306(0)-306(*n*). Cores 304(0)-304(*n*) can generate and send one or more transmission and/or receipt indications associated with their respective network processes 306(0)-306(*n*) to respective network interface controllers 24(0)-24(*n*). Alternatively or additionally, the network processes may be tasks associated with CPU 302 with one or more cores 304(0)-304(*n*) performing at least a portion of each of the tasks.

In an aspect, the cores 304(0)-304(*n*) are configured to operate on network processes 306(0)-306(*n*) as well as non-network processes depending upon a load of switch 312. Network processes 306(0)-306(*n*) can be put into a sleep mode whereby the cores 304(0)-304(*n*) may perform functions other than executing network processes 306(0)-306(*n*). Network processes 306(0)-306(*n*) can be put to sleep for a random period of time based upon statistics of load. Alternatively, network processes 306(0)-306(*n*) may be put to sleep for a controlled period of time using a timer, as discussed below. It is to be noted that even though the network processes 306(0)-306(*n*) are put in a sleep mode, the cores 304(0)-304(*n*) themselves are not halted and other processing related to the network processes 306(0)-306(*n*) continues as usual.

In an aspect, each of the cores 304(0)-304(*n*) includes a respective timer 310(0)-310(*n*) which generates timing signals, although other mechanisms for generating timing signals may be used. In an aspect, the timers 310(0)-310(*n*) are configured to send interrupt signals to the network processes to awaken them from the sleep mode.

In one example, timers 310(0)-310(*n*) can be configured to derive high frequency timing/clocking signals from a local Advanced Programmable Interrupt Controller (APIC) timer 23 located in host system 18, although other types of clock generators (e.g., Real-Time Clock (RTC)) may be used. In the example of FIG. 3, each of timers 310(0)-310(*n*) can be configured to randomize signals sent by cores 304(0)-304(*n*) to network interface controllers 24(0)-24(*n*). Signals from cores 304(0)-304(*n*) result from execution of one or more network processes 306(0)-306(*n*). Alternatively, a coordinated algorithmic mechanism and/or a token that is passed out between two or more network processes 306(0)-306(*n*) may be used to sleep and/or wake up, and the technology is not limited by the type of delaying being used for network processes 306(0)-306(*n*). In another example, timers 310(0)-310(*n*) can be configured to delay transmission indications associated with execution of network processes 306(0)-306(*n*).

As shown in FIG. 3, the network device 110 includes one or more switches 312 coupled to the Network Interface Controllers 24(0)-24(*n*), whereby the switch 312 determines and/or selects which of the Network Interface Controllers 24(0)-24(*n*) can output signals resulting from execution of network processes 306(0)-306(*n*) performed by the CPU 302. Switch 312 may be programmable by the CPU 302 to operate for the particular application in which the network device 110 is to operate. For example, the switch 312 may be configured to operate as a Layer 2 switch that communicates with Network Interface Controllers 24(0)-24(*n*), although other types of switch may be used. Since the switches are known to one of ordinary skill in the art, they will not be described in detail herein.

Subsequently, again depending upon a real-time load or utilization level of switch 312 that communicates with network(s) external to network device 110, or a time value for which network processes 306(0)-306(*n*) have been sleeping, network processes 306(0)-306(*n*) are activated or "woken up" and can send transmission indications to network interface controller 24, or more specifically to respective network interface controllers 24(0)-24(*n*). The activation of network processes 306(0)-306(*n*) may be performed in a delayed manner by associating time values with each of the network processes 306(0)-306(*n*) being executed by network device 110. Such delaying can be random or may be calculated based upon one or more delay algorithms. As a result, CPU 302 determines at the network device 110 a timing associated with two or more wakeup events for resuming execution of two or more network processes 306(0)-306(*n*) when the two or more network processes 306(0)-306(*n*) are in a sleep mode. A resumption of the two or more network processes 306(0)-306(*n*) is delayed based upon the determined timing. In this example, since network processes 306(0)-306(*n*) are woken up in a spread out manner due to the delaying, switch 312 is not loaded with bursts of transmission indications resulting in an increase in performance.

In another example, depending upon a load of switch 312, network processes 306(0)-306(*n*) can have transmission indications delayed instead of putting network processes 306(0)-306(*n*) in a sleep mode at different time instances and then waking network processes 306(0)-306(*n*) at yet different instances. In this example, cores 304(0)-304(*n*) are still active but two or more transmission indications from network processes 306(0)-306(*n*) are blocked for a period of time. After the period of time expires, the two or more transmission indications are unblocked. By way of example only, the delay imposed upon transmission indications from cores 304(0)-304(*n*) can be based upon a predetermined threshold value of utilization level or load of switch 312 (e.g., a 50% utilization level). During the period of time when the transmission indications are blocked, they can be queued, for example, in cache memory 21 of network device 110.

It is to be noted the number of components and their specific connections are shown in FIG. 3 by way of example only and not by way of limitation. For example, more or lesser number of components shown in FIG. 3 may be used to achieve the advantages of this technology. Particulars of the process implemented by the network device 110 will now be discussed. It should be noted that one or more network processes 306(0)-306(*n*) may simultaneously and/or alternately perform the method described below on one or more CPUs 302 and timers 310. However, a singular network process 306, a s singular CPU 302 and a singular timer 310 is referred to below in the interest of brevity and should not be considered limiting.

In an aspect, the network device 110 controls the amount of time that network process 306 remains in sleep mode before receiving an interrupt signal from the local APIC timer 310. In an aspect where the CPU 302 has been mostly idle and unused while the network process 306 is in sleep mode, the network process 306 reduces the amount of time while it is allowed to sleep before receiving an interrupt signal from the timer 310. This enables the network device 110 to efficiently handle latency-specific operations (e.g. network traffic) by using the network process 306 more often.

In contrast, the network process 306 will set a relatively longer amount of time before the timer 310 awakens it from sleep mode when it is determined that the CPU 302 had been busy operating on non traffic-related processes while the network process 306 had been asleep. This longer amount of sleep time enables the CPU 302 to handle the non traffic-related processes without having to provide a portion of its computing power to the network process 306, thereby allowing the CPU 302 to efficiently handle operations having large overhead.

In an aspect, the network device 110 is configured such that it handles network traffic processes over other external and/or non-network traffic processes. Thus, the network process 306 is given priority to use CPU processing bandwidth over other operations (e.g. web acceleration, security and the like). In an aspect, the CPU is able to handle non-network traffic when the network process 306 is in sleep mode. Considering that network traffic and non-network traffic processes continually vary with respect to the load placed on the CPU 302, the network process 306 queries the operating system to obtain load information of the CPU and/or other components of the network device 110.

The load information can be estimated in a number of ways depending on a configuration information, defined by a network administrator, as well as the nature of the network traffic. In an aspect, the average load metrics of all cores; the load metrics of one or more selected cores; the load generated by the network traffic management device 110; considering load generated by process of identified priority (e.g. exclude low priority work) and the like.

In addition, the system calculates the sleep duration based on the percentage of the processes that are idle. In an aspect, the system can tailor the minimum and maximum boundaries of sleep durations, the high and low thresholds and the scaling function based on one or more factors. For example, the maximum and minimum sleep durations can be set using example code shown below:

```
#define INV(x) (UINT32)(1000000000/(x))<-scaling function
#define MAX_FREQ INV(schedconf.min_sleep_duration)
#define MIN_FREQ INV(schedconf.max_sleep_duration)
#define MIN_RATIO FIXED16 PERCENT(schedconf.min_yield_scale)<-low threshold (50%)
#define MAX_RATIO FIXED16_PERCENT(schedconf.max_yield_scale)<-high threshold
#define SD_FROM_JR(ir) \
(ir>=MAX_RATIO) ? schedconf.min_sleep_duration: \
(ir<=MIN_RATIO) ? schedconf.max_sleep_duration: \
INV(MIN_FREQ+\
((MAX_FREQ-MIN_FREQ)*(ir-MIN_RATIO))/
(MAX_RATIO-MIN_RATIO))
```

As represented in the above code, the sleep duration is determined from an idle ratio, whereby the scale of the maximum and minimum sleep duration values are based on the amount of time a process is idle. Using example (and modifiable) threshold values, the above code represents that an idle time of between 50%-100% will correspondingly be assigned a minimum sleep duration whereas an idle time of between 0%-7% will be assigned a maximum sleep duration. The above code 8%-49% will be assigned a scaled value between the maximum and minimum sleep duration values. This avoids having the top frequency values from getting too high which may result in high overhead. Accordingly, the top frequency values are limited to ranges that provide reasonable overhead and relatively low latency. The above representation allows for the minimum sleep duration value to be set where the CPU consumption is around 90%. The scaling is performed on the frequency value is preferably linear which entails inverting sleep times to frequency, scaling, and then inverting again to get back to sleep duration.

Based on this load information, the network process selectively adjusts the amount of time that will be in sleep mode on the system for the next cycle and communicates this adjustment to the timer 310 to accommodate CPU handling of network and non-network traffic. In an aspect, the network process instructs the timer to allow it to be in sleep mode for a very short time (e.g 25 microseconds) to reduce latency in handling low load operations. In an aspect, the network process may instruct the timer to allow it to be in sleep mode for a relatively longer time (e.g. 250 microseconds) to reduce overhead for handling high load operations. This allows the network device 110 to scale smoothly and adjust its handling capabilities for each cycle.

Figure 4:
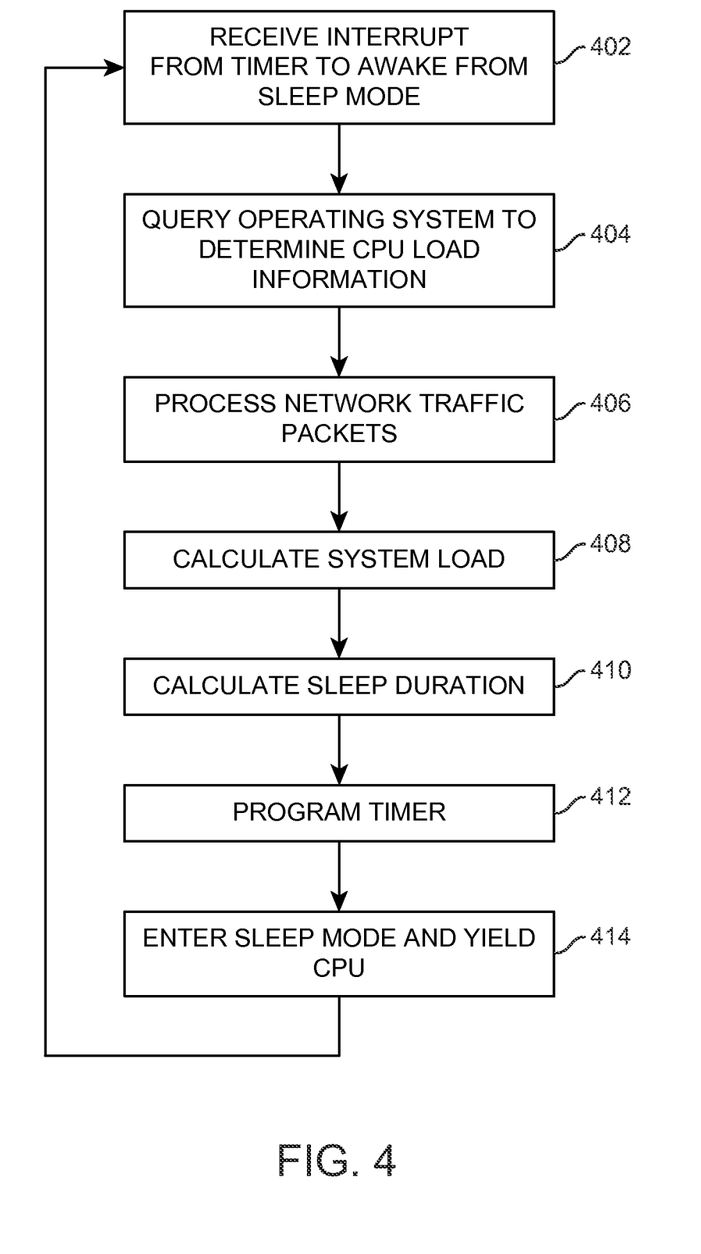
FIG. 4 is a flow chart of an exemplary process and method for idle-driven scheduling in accordance with the present disclosure.

The operation of an example process of the present disclosure using the network device 110 shown in FIGS. 1-3 will now be described in conjunction with the flow diagram 400 in FIG. 4. FIG. 4 illustrates an idle-driven scheduling process in accordance with an aspect of the present disclosure. It is contemplated, in an aspect, that the process 400 is open loop whereby the sleep times of the network process are selectively adjusted from one cycle to the next. It is contemplated, in an aspect, that the network process need not adjust the sleep time for the next cycle if it detects no change in the CPU load from the previous cycle.

In particular, a network process is configured to go into sleep mode for a selected amount of sleep time, which is set by the timer 310 (as will be discussed in more detail below). Once the selected amount of sleep time has expired, the timer 310 sends an interrupt signal to the network processor 306 to waken the network process from being in the sleep mode (Block 402). Thereafter, the network processor 306 queries the operating system (e.g. Linux OS and the like) of the network device 110 to determine the load values of the CPU 302 and/or other necessary information during the selected amount of time that the network process was asleep (Block 404). In particular, the network processor 306 determines whether the CPU 302 had performed any external processes (e.g. web acceleration processes, security processes) or other processes which are not handled by the network processor 306 (Block 406). Thereafter, the network processor 306 calculates the system load in one or more manners as described above (Block 408).

In an aspect, the network processor 306 also calculates the amount of time that the network process is to sleep for the next sleep duration, as described above (Block 410).

Thereafter, the network processor programs the timer to initiate the sleep mode (Block 412), whereby the network process enters the sleep mode (Block 414). Upon the network process entering sleep mode, the CPU is yielded to handle any needed operations for the longer sleep duration. The process then returns to Block 402.

The flowchart 400 is representative of example machine readable instructions for implementing CPU load based scheduling at the network device 110 or at servers 102(1)-102(n). In this example, the machine readable instructions comprise an algorithm for execution by: (a) a processor (e.g., host processor 20), (b) a controller, and/or (c) one or more other suitable processing device(s) within host system 18, for example. The algorithms may be implemented in software stored on tangible computer readable media such as, for example, a flash memory, a CD-ROM, a floppy disk, a hard drive, a digital video (versatile) disk (DVD), or other memory devices. However, it is appreciated that the entire algorithm and/or parts thereof could alternatively be executed by a device other than a processor. It is also appreciated that the algorithm may be implemented in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, or the like).

For example, at least some of the components of the network device 110 could be implemented by software, hardware, and/or firmware. Also, some or all of the machine readable instructions represented by the process in FIG. 4 may be implemented manually at the network device 110 using a command line interface (CLI) prompt window operated by a system administrator. Further, although the example algorithm is described with reference to flowchart 400, it is contemplated that many other methods of implementing the example machine readable instructions may alternatively be used. For example, the order of execution of the blocks in flowchart 400 may be changed, and/or some of the blocks described may be changed, eliminated, or combined.

Having thus described the basic concepts, it will be rather apparent to those skilled in the art that the foregoing detailed disclosure is intended to be presented by way of example only and is not limiting. Various alterations, improvements, and modifications will occur and are intended to those skilled in the art, though not expressly stated herein. The order that the measures and processes for providing secure application delivery are implemented can also be altered. Furthermore, multiple networks in addition to network 112 and LAN 114 could be associated with network device 110 from/to which network packets can be received/transmitted, respectively. These alterations, improvements, and modifications are intended to be suggested by this disclosure, and are within the spirit and scope of the examples. Additionally, the recited order of processing elements or sequences, or the use of numbers, letters, or other designations therefore, is not intended to limit the claimed processes and methods to any order except as can be specified in the claims.

What is claimed is:

1. A method comprising of idle driven scheduling in a network device, the method comprising:
   receiving, by a network device an interrupt signal from a timer, wherein a network processing component of the network device awakes from sleep mode of a first sleep duration for a first cycle upon receiving the interrupt signal;
   determining, by the network device, load information of a computer processing unit in the network device for the first cycle;
   selecting, by the network device, a second sleep duration for the network processing component in a second cycle based on the load information, wherein the second sleep duration is longer than the first sleep duration when the load information indicates the computer processing unit handled a predetermined amount of non network-traffic procedures in the first cycle; and
   instructing, by the network device, the timer to send the interrupt signal to the network processing component at an expiration of the second sleep duration.

2. The method of claim 1, wherein the second sleep duration is longer than the first sleep duration when the load information indicates the computer processing unit handled non network-traffic procedures for a predetermined amount of time during the first cycle.

3. The method of claim 1, wherein the second sleep duration is shorter than the first sleep duration when the load information indicates the computer processing unit was idle for a predetermined amount of time in the first cycle.

4. The method of claim 1, wherein the network processing component queries an operating system of the network device to obtain the load information.

5. The method of claim 1, wherein the network processing component automatically goes into sleep mode after instructing the timer of the second sleep duration, wherein the network processing component yields the computer processing unit.

6. A non-transitory computer readable medium having stored thereon instructions for idle driven scheduling comprising machine executable code which when executed by at least one processor, causes the processor to perform steps comprising:
   receive an interrupt signal from a timer, wherein a network processing component of a network device awakes from sleep mode of a first sleep duration for a first cycle upon receiving the interrupt signal;
   determine load information of a computer processing unit in the network device for the first cycle;
   select a second sleep duration for the network processing component in a second cycle based on the load information, wherein the second sleep duration is longer than the first sleep duration when the load information indicates the computer processing unit handled a predetermined amount of non network-traffic procedures in the first cycle; and
   instruct the timer to send the interrupt signal to the network processing component at an expiration of the second sleep duration.

7. The medium of claim 6, wherein the second sleep duration is longer than the first sleep duration when the load information indicates the computer processing unit handled non network-traffic procedures for a predetermined amount of time during the first cycle.

8. The medium of claim 6, wherein the second sleep duration is shorter than the first sleep duration when the load information indicates the computer processing unit was idle for a predetermined amount of time in the first cycle.

9. The medium of claim 6, wherein the network processing component queries an operating system of the network device to obtain the load information.

10. The medium of claim 6, wherein the network processing component automatically goes into sleep mode after instructing the timer of the second sleep duration, wherein the network processing component yields the computer processing unit.

11. A network device comprising:
   one or more processors;
   a memory coupled to the one or more processors by a bus; and
   a network interface controller coupled to the one or more processors and the memory and configured to be capable of receiving and forwarding data packets from a network that relate to a plurality of applications;

at least one of the one or more processors configured to execute programmed instructions stored in the memory and the network interface controller with logic configured to:

receive an interrupt signal from a timer, wherein a network processing component of a network device awakes from sleep mode of a first sleep duration for a first cycle upon receiving the interrupt signal;

determine load information of a computer processing unit in the network device for the first cycle;

select a second sleep duration for the network processing component in a second cycle based on the load information, wherein the second sleep duration is longer than the first sleep duration when the load information indicates the computer processing unit handled a predetermined amount of non network-traffic procedures in the first cycle; and instruct the timer to send the interrupt signal to the network processing component at an expiration of the second sleep duration.

12. The network device of claim 11, wherein the second sleep duration is longer than the first sleep duration when the load information indicates the computer processing unit handled non network-traffic procedures for a predetermined amount of time during the first cycle.

13. The network device of claim 11, wherein the second sleep duration is shorter than the first sleep duration when the load information indicates the computer processing unit was idle for a predetermined amount of time in the first cycle.

14. The network device of claim 11, wherein the network processing component queries an operating system of the network device to obtain the load information.

15. The network device of claim 11, wherein the network processing component automatically goes into sleep mode after instructing the timer of the second sleep duration, wherein the network processing component yields the computer processing unit.

\* \* \* \* \*